March 26, 1963  D. A. GRASSI ETAL  3,082,643
CONTROL KNOB

Filed July 26, 1960  2 Sheets-Sheet 1

INVENTORS
DONALD A. GRASSI
ROBERT W. NOYES
BY Robert N. O'Connell
ATTORNEY

March 26, 1963 D. A. GRASSI ETAL 3,082,643
CONTROL KNOB
Filed July 26, 1960 2 Sheets-Sheet 2
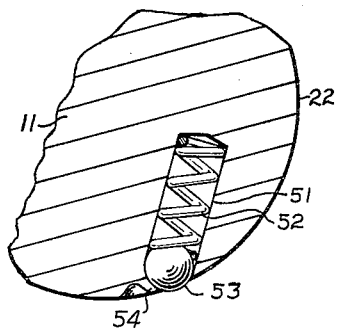
FIG. 3
FIG. 4
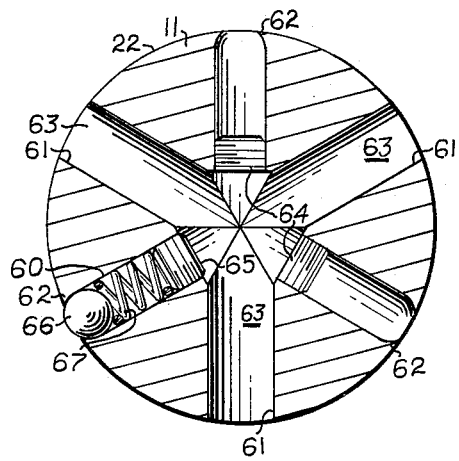
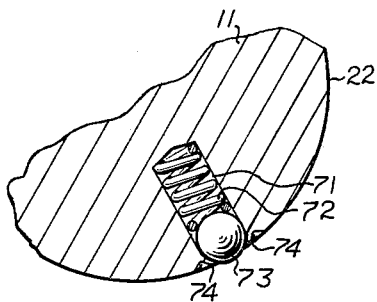
FIG. 5
INVENTORS
DONALD A. GRASSI
ROBERT W. NOYES
BY Robert J. O'Connell
ATTORNEY United States Patent Office 3,082,643
Patented Mar. 26, 1963

3,082,643
CONTROL KNOB
Donald A. Grassi, Bedford, and Robert W. Noyes, Framingham Center, Mass., assignors to Raytheon Company, Lexington, Mass., a corporation of Delaware
Filed July 26, 1960, Ser. No. 45,475
10 Claims. (Cl. 74—553)

The present invention relates to clutched control knobs and is especially concerned with clutched control knobs and shaft assemblies of the type commonly used in electrical apparatus which provide for control from the outside of a cabinet of circuit elements housed within the cabinet. More particularly, the invention relates to knob and shaft assemblies of the kind in which the knob has a pointer which is accurately calibrated with respect to a controlled rotatable shaft such as the wiper of a potentiometer, the rotation or movement of which is limited and wherein it is essential that after the calibration has been established that it not be disturbed as by the application of excess torque to the knob after the control element has been adjusted to a maximum position.

When a direct drive assembly is used in such a case, destruction of the accurate calibration invariably results because the inadvertent application of excess torque as by an operator causes the knob to turn on the shaft or deformation of parts. A conventional assembly utilizing a clutch between the pointer and the control element is unsatisfactory for the simple reason that calibration of the pointer is impossible due to the absence of a direct connection between the pointer and the control element.

While of broader applicability, the apparatus of the present invention is particularly useful with radar systems and the like. In such equipment it is frequently advantageous to utilize a control element for accurate control of circuit arrangements controlling operation of part or all the equipment. This requirement, however, results in inaccurate indications, mal-functioning and the like, if the control element does not remain accurately calibrated.

With the foregoing in mind, it is the principal object of the present invention to provide, in novel combination with control shaft means extending through a cabinet wall or control panel, an inner hub body non-rotatably connectable to shaft means, an outer knob body spaced away from and substantially covering the inner hub body, a plurality of rotatable balls captivatably carried in the inner knob body such that a part of the balls project or protrude from the side of the inner-knob body and engage the cylindrical inner suface of the outer knob body, and means for exerting a force between the outer knob body and the balls sufficient to prevent slippage of the knob bodies relative to each other until a predetermined amount of torque as applied to one of the knob bodies is exceeded whereafter the balls will rotate and function as a clutch to permit continued rotation of one of the knob bodies without exerting any undue rotational strain on the shaft assembly.

It is also an important object of the present invention to permit connection of the improved knob to the shaft means from the outside of the control panel without the necessity of the assembler or service man having access to the interior of the cabinet. This advantageous result is achieved by providing a passage in the sidewall of the outer knob body that may be aligned with a set screw in the inner knob body.

Another feature of the present invention is the provision of apparatus whereby the outer knob body may be easily mounted on the inner knob body or removed therefrom either during or after manufacture of the knob for assembly or adjustment purposes without adversely affecting the clutch means.

A still further feature of the present invention is the provision of apparatus whereby the amount or range of drag exerted by the clutch means is easily changed or adjusted.

The invention further contemplates certain novel constructional features hereinafter described, and illustrated in the accompanying drawings in which:

FIG. 3 is a fragmentary sectional view of modified means for retaining the balls of FIG. 2 in position.

FIG. 4 is a sectional top view of a modification of the invention, and

FIG. 5 is a fragmentary sectional view of modified means for retaining the balls of FIG. 4 in position.

Figure 1:
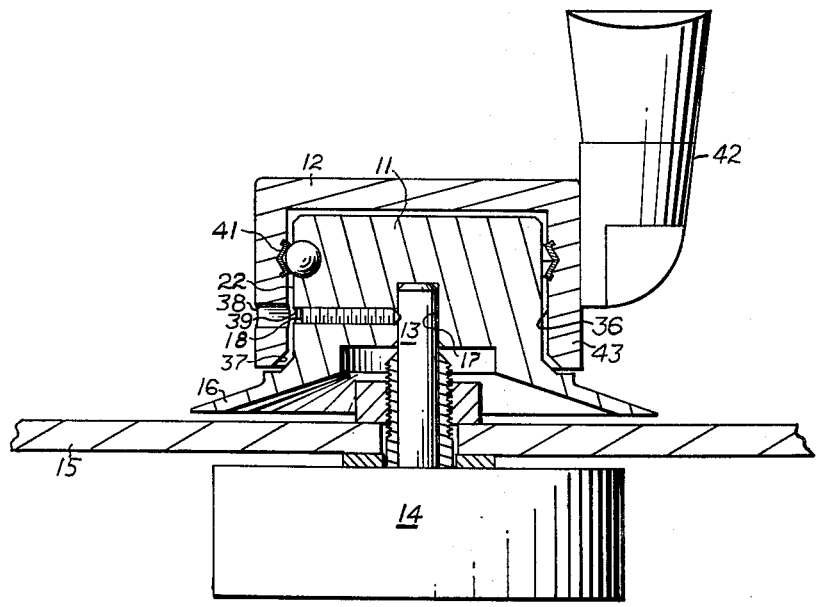
FIG. 1 is a sectional side view illustrating a knob structure embodying the principles of the present invention.
Figure 2:
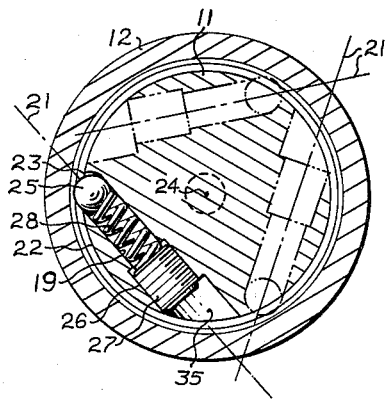
FIG. 2 is a top view partly in section of the knob structure shown in FIG. 1.

Now making more detailed reference to the drawings, and particularly to FIGS. 1 and 2 thereof, there is illustrated a clutched knob structure in accordance with the present invention comprised of inner and outer cylindrical knob bodies 11 and 12, respectively. The knob bodies 11 and 12 are concentrically related to each other and to a shaft 13 which, by way of example, is shown as comprising part of a control element 14 such as a potentiometer attached in conventional manner to a control panel 15 as shown. It is to be understood that the invention is not limited to use with potentiometers and is equally useful with any type of control element wherein control is provided by rotation of a shaft. The inner knob body 11 includes an outwardly extending flange 16 at its lower end and an axial recess 17 for receiving the end-portion of the control shaft 13. A set screw 18 permits non-rotatable connection of the inner knob body 11 to the shaft 13. The inner knob body of the embodiment shown in FIGS. 1 and 2, which is peculiarly adapted for knobs having a small diameter, is further provided with three identical recesses or passages 19 each axial with a cord 21 of the cylindrical surface delineated by the outer side surface 22 of the inner knob body 11. Two of the three identical passages 19 are shown in phantom for the sake of simplicity. To provide passages having maximum length, equally spaced openings 23 in the side wall 22 of the inner knob body, and to prevent interference, the cords 23 or longitudinal axes of each passage 19 when extended sufficient distance should form an equilateral triangle. The passages 19 are preferably coplanar with the longitudinal axes 24 of the knob and are most conveniently formed by a ball end cutter to provide three equally spaced openings 23 having a reduced diameter from that of the passages 19. By not permitting the ball end cutter to entirely emerge from the side wall 22, openings 23 having a reduced diameter may be simply and quickly formed to captivate a ball 25 having a diameter intermediate the reduced diameter of openings 23 and the diameter of the passages 19. Each passage 19 is threaded as at 26 to receive a set screw 27 to vary the compression or force applied to each ball 25 by compression means such as spring 28 interposed between the balls 25 and the set screws 27. If desired, the rear portion of each passage 19 may be counterbored as at 35 to facilitate adjustment of the set screws 27.

Obviously, when a ball 25, spring 28 and set screw 27 are disposed in each passage 19 as best shown in FIG. 2, a majority of each ball 25 will be retained in each passage 19 and a part thereof will project past the side 22 of the inner knob body 11 with a predetermined amount of force as determined by the compressibility of the spring 28 and the location of the set screw 27.

The outer knob body 12, which may be comprised of either plastic or metal, is provided with a cylindrical inner surface 36 having a diameter slightly larger than the outer diameter of the inner knob body 11. The lower portion 37 of the inner surface 36 of the outer knob body extends downwardly and outwardly to facilitate compression of the balls 25 to permit the outer knob body 12 to be easily slipped down over the inner knob body 11. An access hole 38 concentrically adjustable to the threaded radial passage 39 containing set screw 18 is provided to permit adjustment of the set screw 18 for attachment of the knob to the shaft 13 or its removal therefrom. A generally V-shaped race 41 is formed in or pressed into the inner surface 36 intermediate the ends of the outer knob body inner surface to receive the portion of the balls 25 that project from the side 22 of the inner knob body and maintain the inner and outer knob bodies in substantially fixed and spaced relationship. The race 41 in combination with the balls 25 functions as a clutch in addition to maintaining the inner knob and outer knob bodies in substantially fixed and spaced relationship, one with another. An upstanding and rotatable handle 42 is fixably attached to the outer side wall 43 of the outer knob body in conventional manner to facilitate rotation of the shaft 13 by the knob bodies.

It may now be obvious that the springs 28 in the passages 19 cause the balls 25 to project past the side wall 22 of the inner knob body with a predetermined amount of force and to engage the race 41 and be compressed thereby when the inner and outer knob bodies are in assembled positions as shown in FIG. 1. This assembly functions as a clutch and determines the maximum amount of torque that may be applied to the outer knob body before slippage occurs between it and the inner knob body. The range of this maximum amount of torque may be varied by substitution of different springs and adjustment within this range may be selected by adjustment of the set screws in each passage. This arrangement provides a substantially vibration proof clutched knob while still permitting simple and convenient removal or assembly of the outer knob body, if desired.

FIG. 3 shows an alternate construction or modification for captivating the balls. While resulting in a non-adjustable construction, the modification as shown in FIG. 3 may be more simply, conveniently, and economically produced than that of FIG. 2. With particular reference now to FIG. 3, there is shown a recess 51 formed as with a conventional drill identical in location and size to passage 19 of FIG. 2. Recess 51 contains a spring 52 and ball 53 which are captivated by shoulder 54 which may be produced by upsetting a portion of the outer surface 22 of the inner knob body 11 adjacent the opening with a suitably formed die.

Due to the orientation of the passages the embodiments shown in FIGS. 1, 2 and 3 are subject to the disadvantage that a greater torque is required to produce slippage in one direction than in the opposite direction. The embodiment or modification as shown in FIG. 4 overcomes this disadvantage and is to be preferred for knobs having a relatively large diameter. As shown in FIG. 4, three diametral passages 61 spaced apart about 60° and intersecting at the center of the inner knob body 11 are formed as by a ball end cutter to provide each passage with an opening 62 having a reduced diameter and an opening 62 having a diameter equal to the diameter of the passage 61. The portion 64 of each passage 19, remote from its end portion 69, which may be of a diameter less than that of opening 63, is threaded to receive a set screw 65 which is located intermediate the center portion of the inner knob body and the end portion 60 of the passage. Intermediate each set screw 65 and each opening 62 is a ball 66 and a spring 67 to cause the ball 66 to project from the side 22 of the inner knob body 11 with a predetermined amount of force, as and for the purposes described hereinbefore to provide adjustment of the range or adjustment within a range of the force exerted by each ball on the race 41 in the inner wall 36 of the outer knob body. By reason of the provision of radial passages 61, application of the same amount of torque required for slippage in either direction will result in rotation of the captivated balls 66 as may not be the case for passages or recesses axial with a cord of the inner knob body. This is clearly evident since the number and types of points of frictional contact are always the same for the embodiment shown in FIG. 4 for either direction of rotation whereas in the previously described embodiments, such is not necessarily the case.

FIG. 5 shows an alternative construction for captivating the balls in radial passages or recesses. Again, while resulting in a non-adjustable construction, the modification as shown in FIG. 5 may be more simply, conveniently and economically produced than that of FIG. 4. With particular reference now to FIG. 5, there is shown a recess or passage 71 formed as by a conventional drill identical in location and size to passages 19 of FIG. 4. Recess 71 contains a spring 72 and ball 73 which are captivated by a shoulder or shoulders 74 which may be annular or discontinuous and produced by upsetting a portion of the inner knob body adjacent the periphery of the opening of each passage 71. With reference to the formation of the shoulder 74, as shown in FIG. 5, which may be formed in substantially the same manner as the shoulder 54, as shown in FIG. 3, the only difference between its formation and the shoulder 54 in FIG. 3 is that a die having a different end surface to provide, for example, a circumferential shoulder is required. Alternately, if desired, each recess 71 may be counterbored and an insert (not shown) having the desired shoulder configuration placed therein as by a threadable attachment or a press fit. An inner knob body constructed and arranged as shown, for example, in FIGS. 4 and 5, which, obviously may be provided with more than three balls is associated with an outer knob body identical with and in the same manner as that described in connection with FIG. 1.

While the present invention has been described in its preferred embodiments, it is realized that modifications may be made, and it is desired that it be understood that no limitations on the invention are intended other than may be imposed by the scope of the appended claims.

What is claimed is:

1. A knob for connection to a shaft comprising: a cylindrical inner knob body non-rotatably connectable to said shaft and having a plurality of cylindrical recesses opening into the side wall of said inner knob body at spaced points, each said recess having a reduced diameter at the wall of said inner knob body; a ball having a diameter intermediate said reduced diameter and the diameter of said recess disposed in each said recess and having a portion projecting therefrom; an outer knob body rotatably encircling and in contact with said balls; and means for exerting a force between said outer knob body and said balls sufficient to prevent slippage of said knob bodies relative to each other until a predetermined amount of torque applied to said outer knob body is exceeded.

2. A knob for connection to a shaft comprising: a cylindrical inner knob body non-rotatably connectable to said shaft and having a plurality of cylindrical recesses opening into the side wall of said inner knob body at spaced points, each said recess having a reduced diameter at the wall of said inner knob body; a ball having a diameter intermediate said reduced diameter and the diameter of said recess disposed in each said recess and having a portion projecting from the side wall of said inner knob body; an outer knob body encircling said balls and having an inner surface defining a diameter intermediate the outer diameter of said inner knob and that defined by said balls; and compressible means for exerting a force between said outer knob body and said balls sufficient to prevent slippage of said knob bodies relative to each other until a predetermined amount of torque applied to said outer knob body is exceeded.

3. A knob for connection to a shaft comprising: a cylindrical inner knob body non-rotatably connectable to said shaft and having a plurality of cylindrical recesses opening into the side wall of said inner knob body at spaced points, each said recess having a reduced diameter at the wall of said inner knob body; a ball having a diameter intermediate said reduced diameter and the diameter of said recess disposed in each said recess and having a portion projecting outwardly therefrom; an outer knob body having a cylindrical inner surface encircling said balls, said inner surface having a race to receive a portion of said balls that project from the side wall of said inner knob body; and means for exerting a force between said race and said balls sufficient to prevent slippage of said knob bodies relative to each other until a predetermined amount of torque applied to said outer knob body is exceeded.

4. A knob for connection to a shaft comprising: a cylindrical inner knob body non-rotatably connectable to said shaft and having at least three cylindrical passages closed at one end and opening into the side wall of said inner knob body at substantially equally spaced points, each said passage having a reduced diameter at the wall of said inner knob body; a ball having a diameter intermediate said reduced diameter and the diameter of said recess rotatably disposed in each said passage and having a portion projecting outwardly therefrom; an outer knob body having a cylindrical inner surface encircling said balls and at least a portion of said inner knob body; a race formed in said inner surface to receive a portion of said balls that project from the side wall of said inner knob body; and compressible means for exerting a force between said race and said balls sufficient to prevent slippage of said knob bodies relative to each other until a predetermined amount of torque applied to said outer knob body is exceeded.

5. A knob for connection to a shaft comprising: at least three balls; a cylindrical inner knob body non-rotatably connectable to said shaft and having at least three recesses each formed to rotatably retain the majority of one of said balls therein and permit the remainder thereof to project past the side of said inner knob body; means disposed in said recesses to cause each said ball to project from the side of said inner knob body with a predetermined amount of force; and an outer knob body rotatably disposed over said balls, said outer knob body having a race to receive a portion of said balls that project from the side of said inner knob body.

6. A knob for connection to a shaft comprising: at least three balls; a cylindrical inner knob body non-rotatably connectable to said shaft and having at least three recesses each formed to rotatably retain the majority of one of said balls therein and permit the remainder thereof to project past the side of said inner knob body at substantially equally spaced points, each said recess being substantially axial with a chord; means disposed in said recesses to cause each said ball to project from the side of said inner knob body with a predetermined amount of force; and an outer knob body rotatably disposed over said balls, said outer knob body having a race to receive a portion of said balls that project from the side of said inner knob body.

7. A knob for connection to a shaft comprising: at least three balls; a cylindrical inner knob body non-rotatably connectable to said shaft and having at least three passages axial with a cord; means closing one end of each said passage for adjustably varying the length of said passages, each said passage being formed to rotatably retain the majority of one of said balls therein and permit the remainder thereof to project from the side of said inner knob body at substantially equally spaced points; compressible means disposed in each said passage to cause each said ball to project past the side of said inner knob body with a predetermined amount of force; and an outer body having a cylindrical inner surface rotatably disposed over said balls, said inner surface having a race to receive a portion of said balls that project from the side of said inner knob body, said race being located intermediate the ends of said inner surface to maintain said knob bodies in spaced relationship and having a diameter sufficient to compress said balls and prevent slippage of said knob bodies relative to each other until a predetermined amount of torque applied to said outer knob is exceeded.

8. The combination as defined in claim 7 wherein the lower portion of said inner surface extends downwardly and away from said balls and a pointer fixedly attached to the lower portion of said inner knob body extends outwardly past said outer knob body.

9. A knob for connection to a shaft comprising: a cylindrical inner knob body non-rotatably connectable to said shaft and having at least three radial cylindrical recesses opening into the side wall of said inner knob body at substantially equally spaced points, each said recess having a reduced diameter at said wall of said inner knob body; a ball having a diameter intermediate said reduced diameter and the diameter of said recess disposed in each said recess; compressible means disposed in each said recess to cause a portion of said balls to project past the said wall with a predetermined amount of force; an outer knob body having a cylindrical inner surface rotatably disposed over said balls, said inner surface having a race to receive a portion of said balls that project from the side of said inner knob body, said race being located intermediate the ends of said inner surface to maintain said knob bodies substantially in spaced relationship and having a diameter sufficient to compress said balls and prevent slippage of said knob bodies relative to each other unit a predetermined amount of torque applied to said outer knob is exceeded.

10. A knob for connection to a rotatable shaft comprising: a cylindrical knob body non-rotatably connectable to said shaft and having three diametral passages intersecting at the center of said inner knob body, both ends of said passages opening into the side wall of said inner knob body at substantially equally spaced points, every other opening having a reduced diameter at the said wall; a ball having a diameter intermediate said reduced diameter and the diameter of said passage disposed in each said passage adjacent each opening having a reduced diameter; adjustable closure means disposed in each passage intermediate the center of said inner knob body and said balls for adjustably varying the distance between said closure means and said balls; compressible means interposed between said closure means and each said ball to cause each said ball to project past the side of said inner knob body with a predetermined amount of force; and an outer knob body having a cylindrical inner surface rotatably disposed over said balls, said inner surface having a race to receive a portion of said balls that project from the side of said inner knob body, said race being located intermediate the ends of said inner surface to maintain said knob bodies substantially in spaced relationship and having a diameter sufficient to compress said balls and prevent slippage of said knob bodies relative to each other until a predetermined amount of torque applied to said outer knob is exceeded.

References Cited in the file of this patent
UNITED STATES PATENTS

| | | |
|---|---|---|
| 1,809,576 | Verderber | June 9, 1931 |
| 2,311,230 | Hill | Feb. 16, 1943 |
| 2,353,824 | Heyne | July 18, 1944 |
| 2,401,992 | Waller | July 11, 1946 |
| 2,409,545 | Cornwell | Oct. 15, 1946 |
| 2,445,211 | Drake | July 13, 1948 |
| 2,704,969 | Mische | Mar. 29, 1955 |
| 2,899,841 | Melloy | Aug. 18, 1959 |
| 2,914,153 | Krause et al. | Nov. 24, 1959 |
| 2,919,602 | Spraragen | Jan. 5, 1960 |